US006398220B1

(12) United States Patent
Inoue

(10) Patent No.: US 6,398,220 B1
(45) Date of Patent: Jun. 4, 2002

(54) SYMBOL DISPLAYING DEVICE AND GAME MACHINE USING THE SAME

(75) Inventor: Haruo Inoue, Tokyo (JP)

(73) Assignee: Eagle Co., Ltd., Tokyo (JP)

( * ) Notice: Subject to any disclaimer, the term of this patent is extended or adjusted under 35 U.S.C. 154(b) by 0 days.

(21) Appl. No.: 09/535,966

(22) Filed: Mar. 27, 2000

(51) Int. Cl.[7] .......................... A63B 71/00; A63F 1/18; A63F 13/00

(52) U.S. Cl. .............................. 273/142 R; 273/138.1; 273/139; 463/16

(58) Field of Search .............................. 273/138.1, 139, 273/141 R, 14 R, 143 R, 143 A, 142 A, 121 B; 463/16–21; 434/188, 198, 193, 206, 127 R, 127 D

(56) References Cited

U.S. PATENT DOCUMENTS 5,462,277 A * 10/1995 Takemoto ............... 273/121 B
6,105,962 A * 8/2000 Malavazos et al. ..... 273/143 R
6,113,098 A * 9/2000 Adams .................. 273/143 R

FOREIGN PATENT DOCUMENTS

JP 6-327807 11/1994

* cited by examiner

*Primary Examiner*—Jessica Harrison
*Assistant Examiner*—Alex F. R. P. Rada, II
(74) *Attorney, Agent, or Firm*—Young & Thompson

(57) ABSTRACT

A displaying device comprises an outer rotational member and an inner rotational member. The displaying device is incorporated with a game machine. The outer rotational member of the displaying device is rotated in a lateral direction of the game machine. The inner rotational member is rotated in a perpendicular direction of the game machine. The rotational members are rotated in the different directions with each other, and are respectively stopped. After the rotational members have been stopped, a game result is determined in accordance with a stop state of the rotational members. The outer rotational member represents a dividend of the game, and the inner rotational member represents whether the game is a win or loss.

19 Claims, 7 Drawing Sheets

SYMBOL DISPLAYING DEVICE AND GAME MACHINE USING THE SAME

BACKGROUND OF THE INVENTION

1. Field of the Invention

The present invention relates to a symbol displaying device and a game machine using the same in which rotational members having predetermined symbols (mark, numeral, letter, pattern and so forth) are rotated in different directions. In this game machine, existence and kind of winning are determined in accordance with a combination of the symbols which is displayed when the rotational members are stopped.

2. Description of the Related Art

Conventionally, there is a game device in which a wheel is rotated. This wheel is provided with scores arranged at an edge portion thereof. In this game device (so-called wheel of fortune), existence and a dividend of winning are determined in accordance with a position pointed by a stopper when the wheel is stopped.

Such game device has an advantage that a game rule is easily understood. Thus, a beginner can easily try the game. Further, such game machine has another advantage that a lot of persons can enjoy the game at the same time. Meanwhile, this game device has a shortcoming that the game itself is easy and simple so that its interest is likely to be lost.

Recently, there is a game machine in which the above game device is arranged at an upper portion of a slot machine. In this game machine, the wheel is rotated as a sub-game when special winning occurs in the slot machine game. Hence, it is possible to obtain a winning score with an additional score.

As to this game machine, a player has possibility of obtaining a high score. At the same time, the wheel is located at the upper position so that the rotation of the wheel may be watched by the surrounding persons. Thus, such game machine has great appeal for not only the player but also the surrounding persons.

However, the wheel of the above-mentioned game machine is constructed so as to merely rotate in one direction similarly to the foregoing game device. For this, an interest is lost upon long-term playing so that giving the sufficient appeal is not expected.

Otherwise, Japanese Patent Laid-Open publication No. 6-327807 discloses a roulette game machine in which rotating reels (inner rotational members) are disposed at the inside of a rotating wheel (outer rotational member). The rotating wheel has symbols arranged thereon. In this roulette game machine, rotational members are combined so as to rotate in different directions.

With respect to this game machine, it is possible to obtain symbol combinations having plentiful variation. Further, it is possible to realize various combinations of the rotational members. However, a motor for rotating the wheel is provided at a rear-central portion of the game machine, and a support frame is disposed in front of the motor to hold the rotating reel. For this, a size and a shape of the inner rotational member are limited. Hence, it can not be expected to give great appeal for the surrounding persons.

SUMMARY OF THE INVENTION

In view of the foregoing, it is a primary object of the present invention to provide a symbol displaying device in which rotational members are rotated in different directions with each other, and structure for combining the rotational members is improved.

It is a second object of the present invention to provide a symbol displaying device in which symbol combinations having plentiful variation are obtained.

It is a third object of the present invention to provide a symbol displaying device in which its appeal effect is improved.

It is a fourth object of the present invention to provide a game machine in which the above-mentioned displaying device is utilized.

In order to achieve the above and other objects, the symbol displaying device according to the present invention comprises a first rotational member and a second rotational member, and is incorporated with a game machine. The first and second rotational members are rotated in different directions with each other.

In a preferred embodiment, the first rotational member has a ring-like shape, and is rotated in a lateral direction of the game machine. In other words, the ring-shaped first rotational member is rotated around its center such that a surface thereof is rotated in parallel with a face of the game machine.

The second rotational member has a disk-like shape, and is disposed at an inner portion of the first rotational member. The second rotational member is rotated in a perpendicular direction of the game machine. In other words, the second rotational member is rotated in a state that its lateral center line is adapted to be a rotational axis of the second rotational member. Meanwhile, the second rotational member is stopped at two predetermined positions so as to surely display either face of the second rotational member.

The first and second rotational members are rotated in the different directions with each other, and are respectively stopped by a stop operation of a player. Alternatively, each of the rotational members may be automatically stopped in response to a lapse of a predetermined period. After the first and second rotational members have been stopped, a game result is determined in accordance with a stop state of the first and second rotational members.

In a preferred embodiment, the outer rotational member represents a dividend of the game, and the inner rotational member represents whether the game is a win or loss.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT (S)

Figure 1:
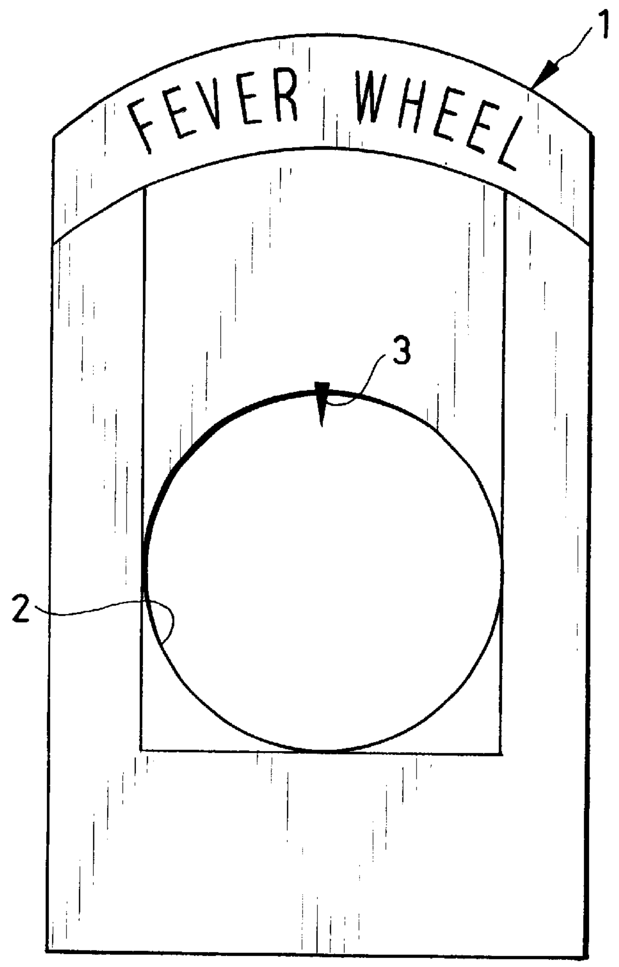
FIG. 1 is a front view showing a front panel of a symbol displaying device.

FIG. 1 shows a front panel 1 on which graphic design is provided. The front panel 1 has an opening 2 formed in a central portion thereof. A rotating unit described later is arranged behind the opening 2.

A cutout (not shown) is provided at an upper position of the opening 2. Into this cutout, a pointer 3 having a triangle shape is fitted. The pointer 3 is securely fixed by a screw, an adhesive or the like, and is for representing existence and a dividend of winning when the rotating unit is stopped.

Figure 2:
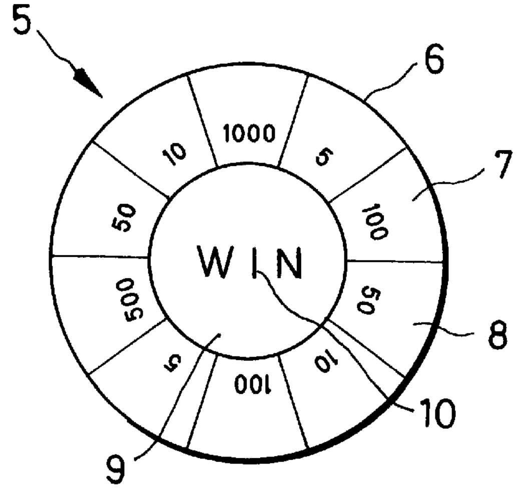
FIG. 2 is a front view showing a rotating unit.

FIG. 2 is a front view of the rotating unit 5 constituted of an outer rotational member 6 and an inner rotational member 9. The outer rotational member 6 (wheel) has a doughnut-like shape and an outer periphery thereof is provided with a gear. Moreover, the outer rotational member 6 is formed so as to be slightly larger than the opening 2, and is rotated in a lateral direction of a machine body. The outer rotational member 6 is partitioned into plural sections 7, on each of which any dividend 8, for example 5, 10, 500, or 1000, is arranged.

Inside the outer rotational member 6, the inner rotational member 9 is disposed so as to have a gap between them. The inner rotational member 9 is a thick disk comprising a front face and a rear face, and is rotated in a perpendicular direction of the machine body. On the front face of the inner rotational member 9, a sign (letters) 10 of "WIN" is printed, whereas a sign of "LOSS" is printed on the rear face thereof.

Figure 3:
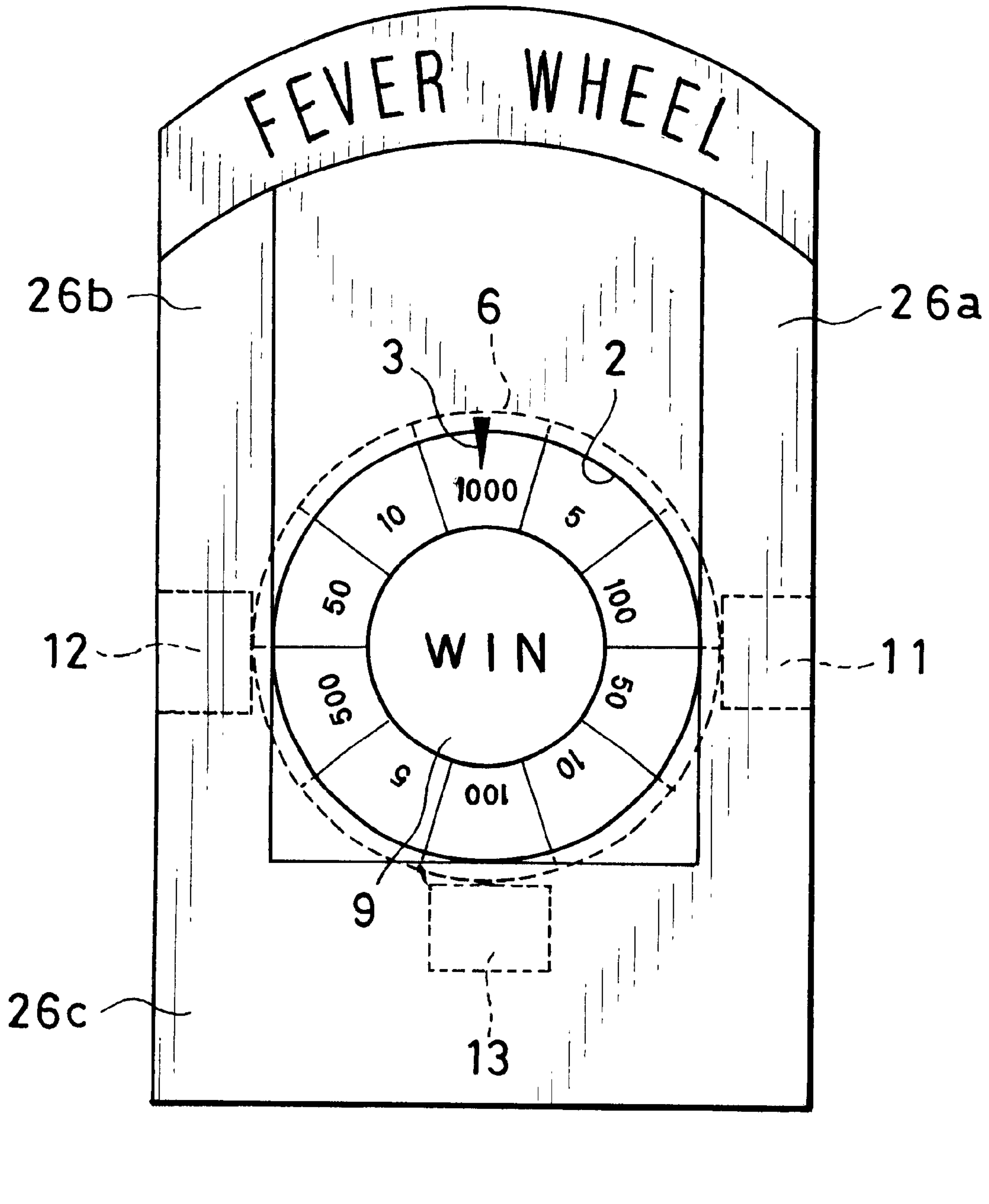
FIG. 3 is a front view showing a state in that the rotating unit is attached to the front panel.

FIG. 3 is a front view showing a state in that the rotating unit 5 is attached to the front panel 1. The rotating unit 5 is supported by wheel supporters 11, 12 and 13 so as to be disposed at the rear side of the opening 2. The front panel 1 is provided with a right protrusion 26*a*, a left protrusion 26*b* and a lower protrusion 26*c*. These protrusions are described later.

Figure 4:
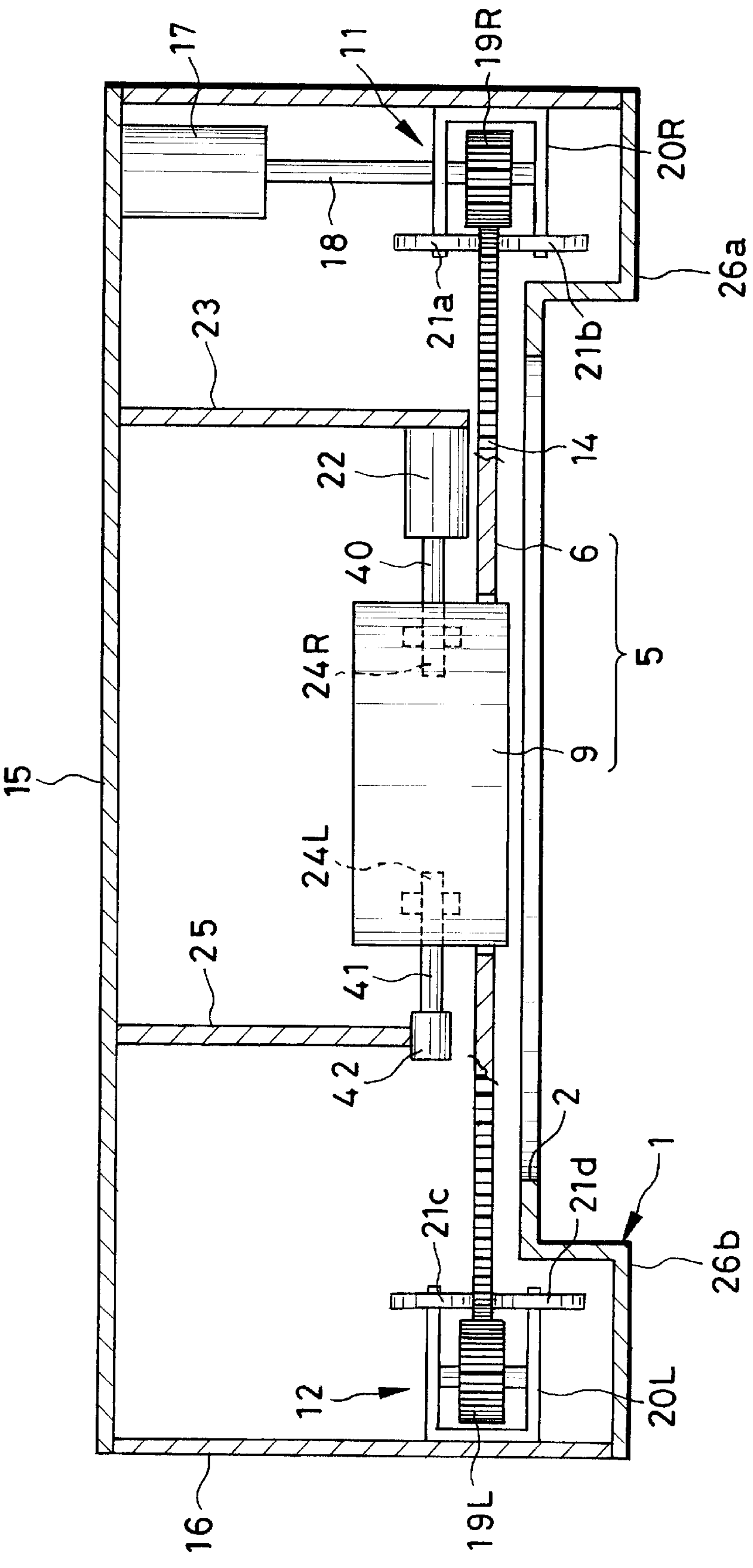
FIG. 4 is a sectional view of the symbol displaying device.

In FIG. 4, reference numerals 15 and 16 denote a rear panel and a side panel respectively. The rear panel 15 and the side panel 16 constitute the machine body together with the front panel 1. Reference numeral 17 denotes a motor for driving the outer rotational member 6. The motor 17 is fixed to the rear panel 15 and is connected to a toothed wheel 19R via a motor shaft 18. The toothed wheel 19R meshes with a gear 14 which is formed on the periphery of the outer rotational member 6 in order to rotate the outer rotational member 6.

In response to an input of a start signal and an input of a stop signal, rotation of the outer rotational member 6 is started and stopped respectively. If a rotational speed of the outer rotational member 6 is gradually slowed down at the time of stopping, a position pointed by the pointer 3 is adapted to be slowly changed. In this case, an interest of the game is increased.

Reference numeral 21*a* and 21*b* denote rollers provided so as to catch the outer rotational member 6 from both sides thereof. The rollers 21*a* and 21*b* rotate together with the outer rotational member 6, and prevent the outer rotational member 6 from slipping out. Incidentally, the rollers 21*a* and 21*b* are rotatably attached to a bracket 20R fixed to the side panel 16.

The wheel supporter 11 is constituted of the toothed wheel 19R, the bracket 20R and the rollers 21*a* and 21*b*. In the same way, the wheel supporter 12 is constituted of a toothed wheel 19L, a bracket 20L and rollers 21*c* and 21*d*. The wheel supporters 11 and 12 are respectively contained in a protrusions 26*a* and 26*b* formed at both sides of the front panel 1.

The wheel supporter 12 is similar to the wheel supporter 11 with regard to its structure, except that the toothed wheel 19L is not connected to a motor shaft.

Reference numeral 22 denotes a motor for rotating the inner rotational member 9. The motor 22 is fixed to a mounting plate 23 attached to the rear panel 15. The motor 22 has a motor shaft 40 to which a cross member 24R is securely attached. The cross member 24R is embedded in the inner rotational member 9.

At an opposite side to the motor 22, a rotary shaft 41 to which a cross member 24L is securely attached is rotatably supported by a bearing 42. The cross member 24L is also embedded in the inner rotational member 9. The bearing 42 is fixed to a mounting plate 25 attached to the rear panel 15.

The motor 22 is a stepping motor having a built-in sensor for detecting two stop positions. In virtue of this, the inner rotational member 9 is stopped such that either face of "WIN" and "LOSS" is displayed for a player.

Although the wheel supporter 13 is provided at a lower side of the rotating unit 5 such as shown in FIG. 3, this wheel supporter 13 is omitted in FIG. 4. The wheel supporter 13 has structure being similar to that of the wheel supporter 12, and is disposed so as to face upward.

Figure 5:
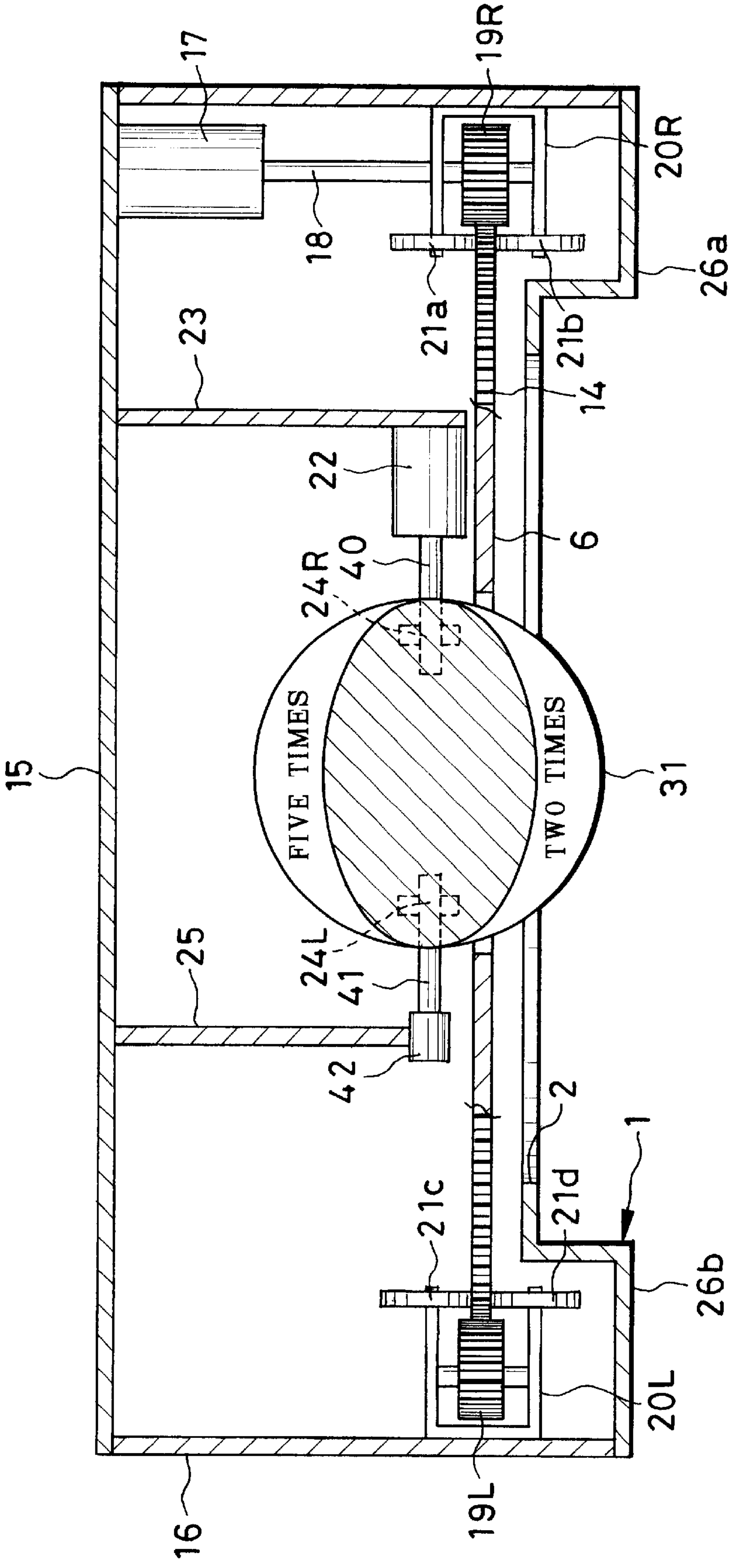
FIG. 5 is a sectional view of the symbol displaying device of another embodiment.

FIG. 5 is a sectional view showing another embodiment. An inner rotational member 31 has a sphere shape. A surface of the inner rotational member 31 observed through the opening 2 of the front panel 1 is partitioned into plural sections (for example, four sections). On each section, is arranged a mark (letter) for representing a predetermined dividend of two times, three times, five times, ten times or the like.

Figure 6:
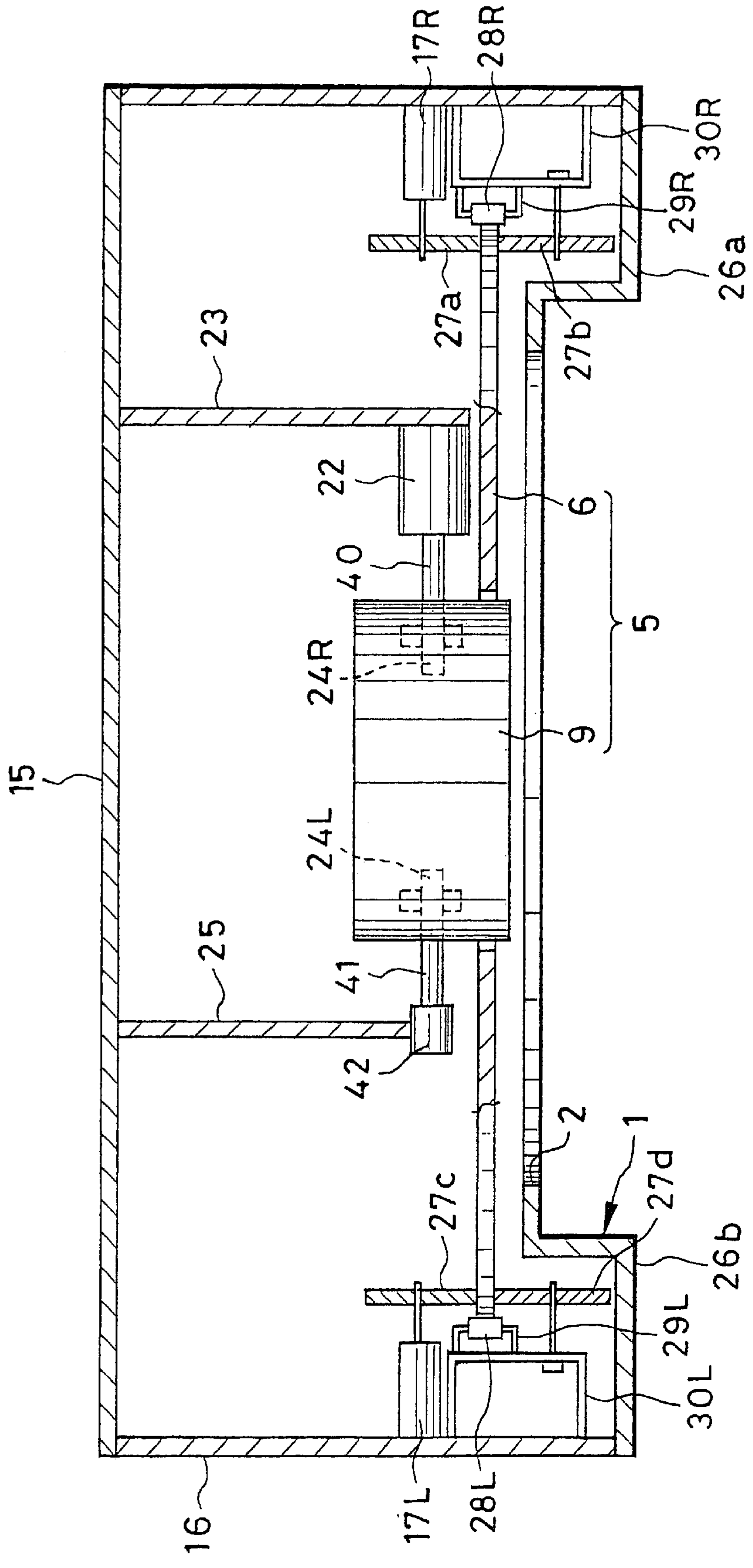
FIG. 6 is a sectional view of the symbol displaying device of the other embodiment.

FIG. 6 is a sectional view showing the other embodiment. The periphery of the outer rotational member 6 is not provided with a gear. The outer rotational member 6 is rotated by rollers 27*a*, 27*b*, 27*c* and 27*d* arranged so as to catch the outer rotational member 6 from both sides thereof. The roller 27*a* is connected to a driving motor 17R, and the roller 27*b* is rotatably attached to a bracket 30R. Similarly, the roller 27*c* is connected to a driving motor 17L, and the roller 27*d* is rotatably attached to a bracket 30L. Otherwise, every roller may be connected to each motor in order to reinforce the rotational driving power relative to the outer rotational member 6.

In FIG. 6, reference numerals 28R and 28L denote rollers which are rotatably attached to roller supporters 29R and 29L respectively. The rollers 28R and 28L prevent the outer rotational member 6 from slipping out.

In order to preclude the outer rotational member 6 and the rollers 27*a*–27*d* from racing, a contact surface thereof may be made of a material being superior with regard to its friction properties. Otherwise, a groove for engaging with each other may be provided. In this case, it is possible to rotate them more certainly.

Figure 7:
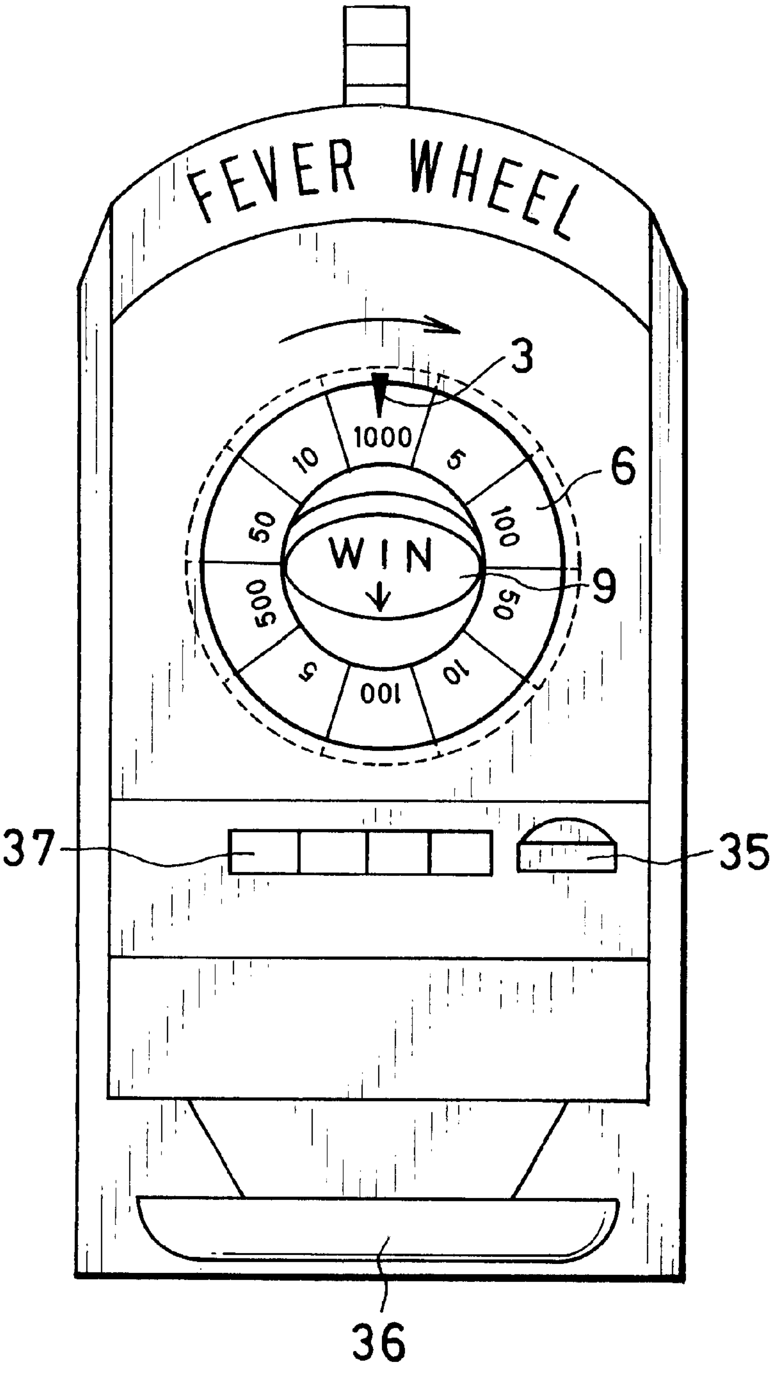
FIG. 7 is a front view showing a game machine in which the symbol displaying device is used.

FIG. 7 is a front view of a game machine in which the above-described displaying device is utilized. This game machine comprises a coin inlet 35 for inserting a coin, a coin tray 36 for discharging a coin, and various switches for starting, stopping, betting, taking a score, and so forth. The game machine is controlled based on a game program carried out by a CPU.

After putting a coin into the game machine, the outer rotational member 6 is rotated in a clockwise direction (alternatively, in a counterclockwise direction) upon an operation of a start button 37. The rotation of the outer rotational member 6 is stopped in response to a stop-button operation of a player (alternatively, the outer rotational member 6 is automatically stopped after a predetermined period). A kind of the dividend is represented by a position pointed by the pointer 3 when the outer rotational member 6 is stopped.

Successively, the player operates the start button 37 again to rotate the inner rotational member 9. After that, the rotation of the inner rotational member 9 is stopped in response to the stop-button operation of the player (alternatively, the inner rotational member is automatically stopped after a predetermined period).

As described above, the inner rotational member 9 is adapted to stop at two positions. In other words, the inner rotational member 9 is stopped such that either face thereof is displayed. The word "WIN" is printed on one face of the inner rotational member 9, and the word "LOSS" is printed on the other face thereof. The winning is determined in accordance with the word represented by the inner rotational member. When the winning occurs, the player can obtain a prize corresponding to the dividend pointed by the pointer 3. Otherwise, in case of the winning, the player may play the game consecutively. Incidentally, the game contents are not exclusive to this embodiment.

For instance, when the inner rotational member 31 has the sphere shape such as shown in FIG. 5, the surface thereof may be partitioned into four sections on which the prescribed dividends are respectively printed. These prescribed dividends are WIN (double), LOSS, WIN (five times) and LOSS, for example. Both of the winning and the dividend are determined in accordance with the representation of the surface when the inner rotational member 31 is stopped.

In case both of the winning and the dividend are determined by the outer rotational member, it is possible to use the inner rotational member in a sub-game, for example in a double-up game.

In any event, the winning and the dividend may be suitably determined, and the game contents may be variously altered.

Figure 8:
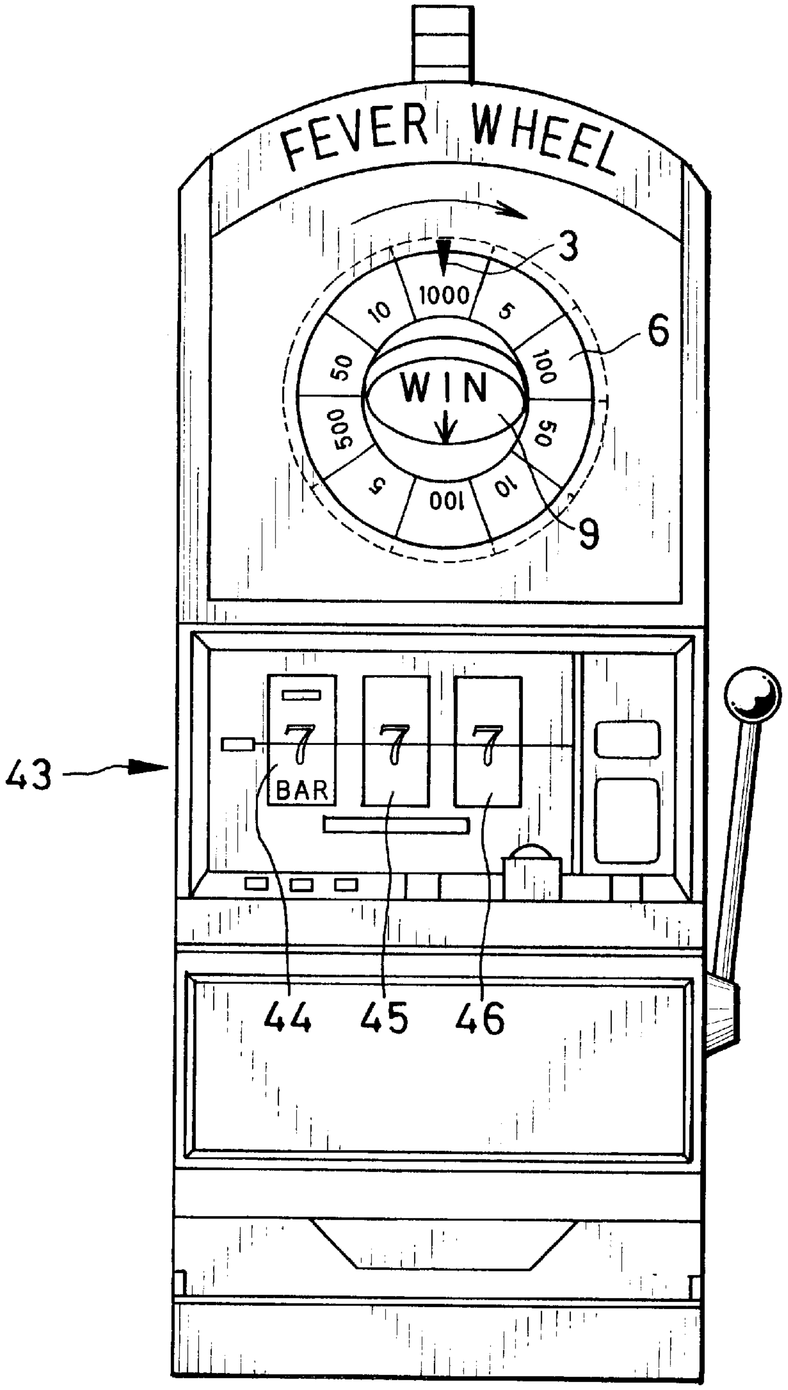
FIG. 8 is a front view showing a slot machine in which the symbol displaying device is used.

FIG. 8 is a front view of a slot machine 43 in which the above-mentioned displaying device is utilized. The slot machine 43 may be a reel driving type in which actual reels 44, 45 and 46 are rotated. Alternatively, the slot machine may be a video type in which image reels are simulatively rotated on the basis of graphic data stored in a ROM. In either case, basic structure of the slot machine itself is similar to that of the conventional one, further, its electrical structure is also similar to that of the conventional one. U.S. Pat. Nos. 5,984,782 and 5,863,249 and 5,752,881, the disclosure of which is herein incorporated by reference, disclose slot machines, each of which forms the starting material for the slot machine according to the present invention.

Different point is that the displaying device of the present invention is manually or automatically activated when a predetermined symbol combination occurs in the slot machine game or when a predetermined condition is satisfied in the slot machine game. The winning and the dividend are finally determined in accordance with the display result when the rotating unit is stopped, such as described above. In case of the winning, the coins are paid out in addition to the normal dividend of the slot machine game. A control unit (CPU) of the slot machine 43 is electrically connected to an inputting device of the start signal and the stop signal, a random number generator, a rotating device, a judging device, an illuminating device and so forth to control them. By the way, such control may be performed by another control unit (a second CPU) which is separately provided from the control unit of the slot machine.

In virtue of the above-mentioned structure, it is expected that there is a possibility of obtaining the high dividend in addition to the normal dividend of the slot machine game. At the same time, the displaying device is located at an upper position so that appeal effect caused by the combination of the different rotational directions is increased for the surrounding player.

The displaying device of the present invention may be used for a pinball machine. In this case, the displaying device is miniaturized and is arranged behind a playing board.

The display of the rotational member, especially of the inner rotational member, is regulated on its stop position. Moreover, the display of the inner rotational member must be accurately stopped. Thus, in case the stepping motor is not employed, it is necessary to provide a brake mechanism for stopping the rotational member, and a sensor for detecting the stop position of the display of the rotational member.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A symbol displaying device having a first symbol group and a second symbol group, each of said first and second symbol groups being moved in a stoppable, rotary manner, and a win being determined in accordance with a stop state of said first and second symbol groups, said symbol displaying device comprising:

a first rotational member for rotation in a first direction and having said first symbol group thereon; and a second rotational member for rotation in a second direction and having said second symbol group thereon, a plane of said second direction being perpendicular to a plane of said first direction, wherein said first rotational member is annular and has an opening in a central portion, said second rotational member fitting into said opening, and wherein said second rotational member comprises means for displaying results on a plurality of faces.

2. The symbol displaying device according to claim 1, wherein each symbol of said first symbol group is on a first face of said first rotational member and at an outer portion thereof.

3. The symbol displaying device according to claim 1, wherein said means for displaying results has an axis of rotation and only two of said plurality of faces are alternately visible as said means for displaying results rotates around said axis of rotation.

4. The symbol displaying device according to claim 3, wherein said first symbol group represents a dividend, and said second symbol group represents one of a win and a loss.

5. The symbol displaying device according to claim 3, wherein said second rotational member further comprises:

a cross member for rotation of the second rotational member about the rotational axis of the second rotational member; and a second motor for rotating said cross member.

6. The symbol displaying device according to claim 5, wherein said second motor is a stepping motor.

7. The symbol displaying device according to claim 1, wherein a periphery of said first rotational member comprises a gear for rotating said first rotational member.

8. The symbol displaying device according to claim 7, further comprising:

a toothed wheel for meshing with said gear of said first rotational member; and a first motor for rotating said toothed wheel, said first motor having a drive shaft spaced apart from a rotational axis of said first rotational member.

9. The symbol displaying device according to claim 8, further comprising:

four rollers, two of said four rollers contacting said first face of said first rotational member and another two of said four rollers contacting said second face of said first rotational member, said four rollers preventing lateral movement of said first rotational member.

10. The symbol displaying device according to claim 9, wherein said first rotational member is rotatably supported by the four rollers.

11. The symbol displaying device according to claim 1, further comprising:

a driving roller contacting a first surface of said first rotational member; and a motor for rotating said driving roller, said motor rotating said first rotational member via said driving roller.

12. The symbol displaying device according to claim 1, wherein the means for displaying results comprises a sphere.

13. The symbol displaying device according to claim 1, wherein the means for displaying results comprises a disk.

14. A game machine including a symbol displaying device having a first symbol group and a second symbol group, each of said first and second symbol groups being moved in a stoppable, rotary manner, and a win being determined in accordance with a stop state of said symbol groups, said symbol displaying device comprising:

a first rotational member that rotates in a first direction and has said first symbol group thereon; and a second rotational member that rotates in a second direction and has said second symbol group thereon, a plane of said second direction being perpendicular to a plane of said first direction, wherein said first rotational member is annular and has an opening in a central portion, said second rotational member fitting into said opening, wherein said second rotational member is circular and has only a first face and a second face, and wherein said second rotational member has a rotational axis to alternately show one of the first and second faces of said second rotational member.

15. The game machine according to claim 14, wherein said game machine is a slot machine having a plurality of reels.

16. A symbol displaying device having a first symbol group and a second symbol group, each of said first and second symbol groups being moved in a stoppable, rotary manner, and a win being determined in accordance with a stop state of said first and second symbol groups, said symbol displaying device comprising:

a first rotational member that rotates in a first direction and has said first symbol group;

a second rotational member that rotates in a second direction and has said second symbol group, a plane of said second direction being perpendicular to a plane of said first direction; and means for rotating said first rotational member, wherein said first rotational member is annular and has an opening in a central portion, said second rotational member fitting into said opening.

17. The symbol displaying device according to claim 16, wherein said means for rotating the first rotational member comprises a gear around a periphery of the first rotational member.

18. The symbol displaying device according to claim 17, further comprising:

a toothed wheel for meshing with said gear of said first rotational member; and a first motor for rotating said toothed wheel, said first motor having a drive shaft spaced apart from said rotational axis of said first rotational member.

19. The symbol displaying device according to claim 16, wherein said means for rotating the first rotational member comprises:

a driving roller for contacting a surface of said first rotational member; and a motor for rotating said driving roller, said motor rotating said first rotational member via said driving roller.

* * * * *